United States Patent
Mori

(10) Patent No.: US 12,345,870 B2
(45) Date of Patent: Jul. 1, 2025

(54) IMAGE PROCESSING SYSTEM SELECTING LEARNED MODEL BASED ON SETTING INFORMATION OF A MICROSCOPE SYSTEM, AND IMAGE PROCESSING METHOD AND COMPUTER-READABLE MEDIUM

(71) Applicant: Evident Corporation, Nagano (JP)

(72) Inventor: Keigo Mori, Tokyo (JP)

(73) Assignee: Evident Corporation, Nagano (JP)

( * ) Notice: Subject to any disclaimer, the term of this patent is extended or adjusted under 35 U.S.C. 154(b) by 363 days.

(21) Appl. No.: 17/731,407

(22) Filed: Apr. 28, 2022

(65) Prior Publication Data

US 2022/0252857 A1    Aug. 11, 2022

Related U.S. Application Data

(63) Continuation of application No. PCT/JP2019/044942, filed on Nov. 15, 2019.

(51) Int. Cl.
*G06T 7/00* (2017.01)
*G02B 21/36* (2006.01)

(52) U.S. Cl.
CPC .......... *G02B 21/367* (2013.01); *G06T 7/0012* (2013.01); *G06T 2207/10056* (2013.01);
(Continued)

(58) Field of Classification Search
None
See application file for complete search history.

(56) References Cited

U.S. PATENT DOCUMENTS

2007/0165112 A1* 7/2007 Shinmei ............... G06T 5/70
348/E5.079
2013/0215251 A1* 8/2013 Yamamoto ............ G02B 21/36
348/79
(Continued)

FOREIGN PATENT DOCUMENTS

JP    2007189589 A    7/2007
JP    2018137275 A    8/2018
(Continued)

OTHER PUBLICATIONS

Japanese Office Action (and an English language translation thereof) dated Apr. 23, 2024, issued in counterpart Japanese Application No. 2021-555765.
(Continued)

*Primary Examiner* — Akwasi M Sarpong
*Assistant Examiner* — Pawan Dhingra
(74) *Attorney, Agent, or Firm* — Holtz, Holtz & Volek PC

(57) ABSTRACT

An image processing system includes a microscope system that acquires an input image to be input to an image processing device, and the image processing device including a circuitry. The circuitry selects a learned model from a plurality of learned models that have learned image conversion that converts the input image into an output image having an image quality higher than an image quality of the input image, and performs the image conversion using the selected learned model. Each of the plurality of learned models is a learned model learned using an image that differs from an image(s) used by the other learned model(s) in at least sample type, or a learned model learned using an image that differs from an image(s) used by the other learned model(s) in at least image quality range.

19 Claims, 16 Drawing Sheets

(52) U.S. Cl.
CPC .............. *G06T 2207/20081* (2013.01); *G06T 2207/30168* (2013.01)

(56) References Cited

U.S. PATENT DOCUMENTS

| | | | |
|---|---|---|---|
| 2016/0004056 A1* | 1/2016 | Takamizawa | G02B 27/58 359/385 |
| 2016/0170193 A1* | 6/2016 | Ue | G02B 27/0068 359/368 |
| 2016/0232682 A1* | 8/2016 | Nakagawa | G01N 33/4833 |
| 2018/0061020 A1* | 3/2018 | Hiasa | G06T 3/60 |
| 2018/0074306 A1* | 3/2018 | Visscher | A61B 5/0064 |
| 2018/0240225 A1* | 8/2018 | Harada | G06T 7/001 |
| 2018/0336662 A1* | 11/2018 | Kimura | G06T 5/70 |
| 2018/0349771 A1* | 12/2018 | Kamilov | G06N 3/084 |
| 2019/0325557 A1* | 10/2019 | Chae | G06T 5/73 |
| 2019/0351016 A1* | 11/2019 | Pekna | A61P 9/10 |
| 2020/0226755 A1* | 7/2020 | Shimozato | G06T 7/0012 |
| 2020/0386684 A1* | 12/2020 | Nomura | G01N 21/6458 |
| 2021/0200986 A1* | 7/2021 | Ohashi | G06F 18/214 |
| 2021/0239952 A1* | 8/2021 | Haase | H01J 37/28 |
| 2021/0397899 A1* | 12/2021 | Watanabe | G06F 18/214 |
| 2022/0058776 A1* | 2/2022 | Ozcan | G06T 3/4046 |

FOREIGN PATENT DOCUMENTS

| | | |
|---|---|---|
| JP | 2018195069 A | 12/2018 |
| JP | 2018206371 A | 12/2018 |
| WO | 2018037521 A1 | 3/2018 |
| WO | 2018225133 A1 | 12/2018 |

OTHER PUBLICATIONS

Japanese Office Action (and an English language translation thereof) dated Nov. 21, 2023, issued in Japanese Application No. 2021-555765.

International Search Report (ISR) (and English language translation thereof) dated Feb. 4, 2020, issued in International Application No. PCT/JP2019/044942.

Wang, et al., "Deep learning enables crossmodality super-resolution in fluorescence microscopy", Nature Methods, vol. 16, p. 103-110, 2019.

Weigert, et al., "Content-aware image restoration: pushing the limits of fluorescence microscopy", Nature Methods, vol. 15, p. 1090-1097, 2018.

* cited by examiner

IMAGE PROCESSING SYSTEM SELECTING LEARNED MODEL BASED ON SETTING INFORMATION OF A MICROSCOPE SYSTEM, AND IMAGE PROCESSING METHOD AND COMPUTER-READABLE MEDIUM

CROSS REFERENCE TO RELATED APPLICATIONS

This is a Continuation Application of PCT Application No. PCT/JP2019/044942, filed Nov. 15, 2019, which was not published under PCT Article 21(2) in English.

BACKGROUND OF THE INVENTION

Field of the Invention

The disclosure of the present specification relates to an image processing system, an image processing method, and a computer-readable medium.

Related Art

In recent years, techniques for improving image quality using machine learning, in particular, deep learning, have been proposed. Such techniques are described, for example, in Hongda Wang, et al., Deep learning enables cross-modality super-resolution in fluorescence microscopy, NATURE METHODS, VOL. 16, p. 103-110, JANUARY 2019; and Martin Weigert, et al., Content-aware image restoration: pushing the limits of fluorescence microscopy, NATURE METHODS, VOL. 15, p. 1090-1097, DECEMBER 2018.

Hongda Wang, et al., Deep learning enables cross-modality super-resolution in fluorescence microscopy, NATURE METHODS, VOL. 16, p. 103-110, JANUARY 2019, describes a technique for converting an image restricted by the diffraction limit into a super-resolution image by using a generative adversarial network (GAN) model. Martin Weigert, et al., Content-aware image restoration: pushing the limits of fluorescence microscopy, NATURE METHODS, VOL. 15, p. 1090-1097, DECEMBER 2018, describes a technique that uses image restoration based on deep learning to extend the range of observable phenomena to biological phenomena that were conventionally difficult to observe.

SUMMARY OF THE INVENTION

An image processing system according to one aspect of the present invention includes: a microscope system that acquires an input image to be input to an image processing device; and the image processing device including a circuitry, wherein the circuitry selects a learned model from a plurality of learned models that have learned image conversion that converts the input image acquired by the microscope system into an output image having an image quality higher than an image quality of the input image, and performs the image conversion using the selected learned model, and each of the plurality of learned models is a learned model learned using an image that differs from an image(s) used by the other learned model(s) in at least sample type, or a learned model learned using an image that differs from an image(s) used by the other learned model(s) in at least image quality range.

An image processing method according to one aspect of the present invention includes: selecting a learned model from a plurality of learned models that have learned image conversion that converts an input image acquired with a microscope system into an output image having an image quality higher than an image quality of the input image; and performing the image conversion using the selected learned model, wherein each of the plurality of learned models is a learned model learned using an image that differs from an image(s) used by the other learned model(s) in at least sample type, or a learned model learned using an image that differs from an image(s) used by the other learned model(s) in at least image quality range.

A computer-readable medium according to one aspect of the present invention is a non-transitory computer-readable medium storing a program that causes a computer to execute processing including: selecting a learned model from a plurality of learned models that have learned image conversion that converts an input image acquired with a microscope system into an output image having an image quality higher than an image quality of the input image; and performing the image conversion using the selected learned model, wherein each of the plurality of learned models is a learned model learned using an image that differs from an image(s) used by the other learned model(s) in at least sample type, or a learned model learned using an image that differs from an image(s) used by the other learned model(s) in at least image quality range.

BRIEF DESCRIPTION OF THE DRAWINGS

The present invention will be more apparent from the following detailed description when the accompanying drawings are referenced.

DESCRIPTION OF THE EMBODIMENTS

In general, a learned model of machine learning is desired to have high generalization performance. However, it is not easy to realize high generalization performance. For example, in a case of a learned model learned by supervised learning, the performance tends to deteriorate for images that are significantly different from those used in the learning.

In view of the above circumstances, embodiments of the present invention will be described below.

(First Embodiment)

Figure 1:
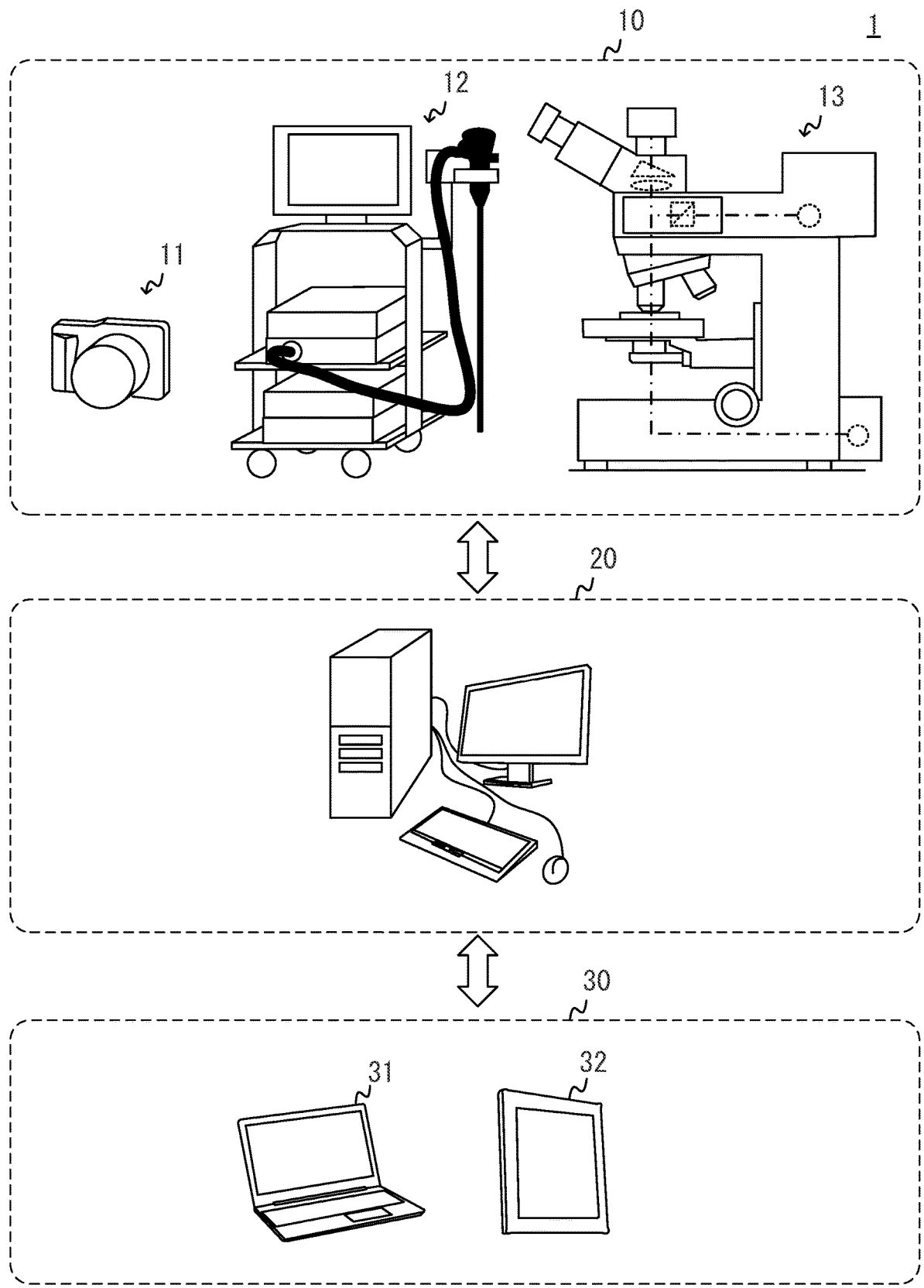
FIG. 1 is a diagram illustrating an example of a configuration of a system.
Figure 2:
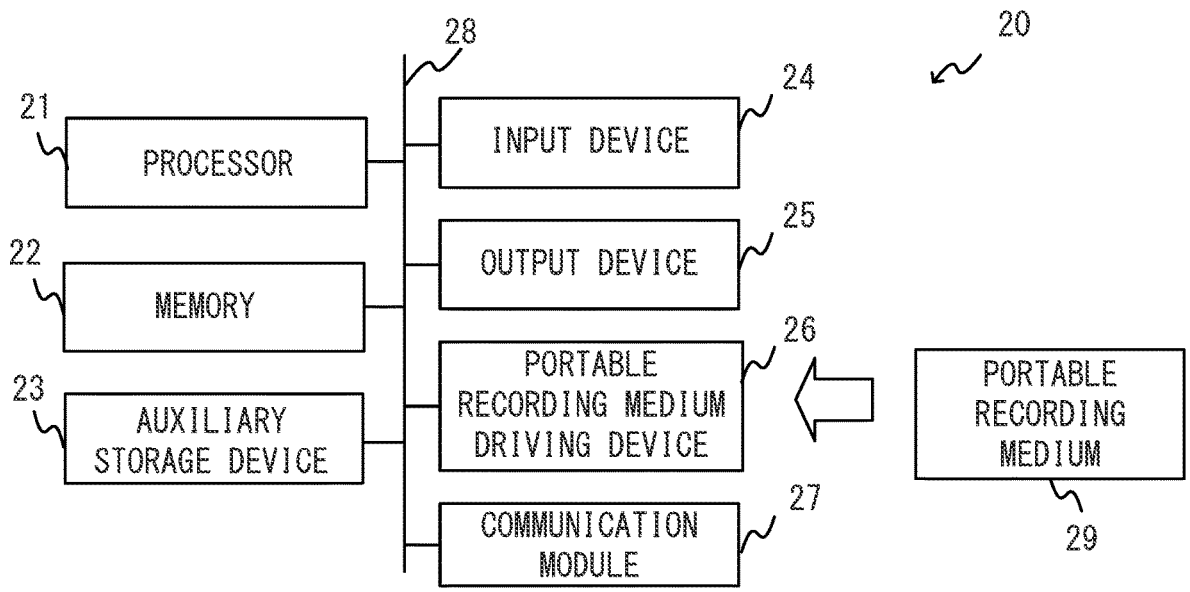
FIG. 2 is a diagram illustrating a physical configuration of an image processing unit.

FIG. 1 is a diagram illustrating an example of a configuration of a system 1. FIG. 2 is a diagram illustrating a physical configuration of an image processing unit 20. Hereinafter, the configuration of the system 1 will be described with reference to FIGS. 1 and 2.

The system 1 illustrated in FIG. 1 is an example of an image processing system that improves image quality, and includes the image processing unit 20 that performs image processing. The system 1 may further include an image acquisition unit 10 that acquires an image to be input to the image processing unit 20. The image processing unit 20 communicates with the image acquisition unit 10 and a terminal unit 30. The terminal unit 30 includes, for example, a notebook terminal device 31, a tablet terminal device 32, and the like. The system 1 may include the terminal unit 30.

The image acquisition unit 10 is a device or system that acquires a digital image of a sample by capturing an image of the sample. The image acquisition unit 10 includes, for example, a digital camera 11, an endoscope system 12, a microscope system 13, and the like. The image acquisition unit 10 outputs the acquired image to the image processing unit 20. The image acquired by the image acquisition unit 10 may be directly sent from the image acquisition unit 10 to the image processing unit 20, or may be indirectly sent from the image acquisition unit 10 to the image processing unit 20 via another device.

The image processing unit 20 is a device or system that performs image processing using a learned model of machine learning, in particular, deep learning. The image processing performed by the image processing unit 20 is image conversion that converts an input image into an output image having higher image quality than the input image, and improvements in image quality such as noise reduction, resolution improvement, and aberration correction are achieved.

The image processing unit 20 only needs to include one or more circuitries, and may be a dedicated or general-purpose computer. Specifically, for example, as illustrated in FIG. 2, the image processing unit 20 includes a processor 21 and a memory 22. The image processing unit 20 may further include an auxiliary storage device 23, an input device 24, an output device 25, a portable recording medium driving device 26 that drives a portable recording medium 29, a communication module 27, and a bus 28. The auxiliary storage device 23 and portable recording medium 29 are each an example of a non-transitory computer-readable recording medium on which programs are recorded.

The processor 21 is, for example, a circuitry including a central processing unit (CPU), a graphics processing unit (GPU), and the like. The processor 21 loads a program stored in the auxiliary storage device 23 or the portable recording medium 29 into the memory 22 and then executes the program to perform programmed processing such as an image processing method described later.

The memory 22 is, for example, any semiconductor memory such as a random access memory (RAM). The memory 22 functions as a work memory that stores a program or data stored in the auxiliary storage device 23 or the portable recording medium 29 when the program is to be executed. The auxiliary storage device 23 is, for example, a nonvolatile memory such as a hard disk or a flash memory. The auxiliary storage device 23 is mainly used for storing various data and programs.

The portable recording medium driving device 26 includes the portable recording medium 29. The portable recording medium driving device 26 can output data stored in the memory 22 or the auxiliary storage device 23 to the portable recording medium 29, and can read programs, data, and the like from the portable recording medium 29. The portable recording medium 29 is any recording medium that is portable. The portable recording medium 29 includes, for example, an SD card, a universal serial bus (USB) flash memory, a compact disc (CD), a digital versatile disc (DVD), and the like.

The input device 24 is, for example, a keyboard, a mouse, or the like. The output device 25 is, for example, a display device, a printer, or the like. The communication module 27 is, for example, a wired communication module that communicates with the image acquisition unit 10 and the terminal unit 30 connected via an external port. The communication module 27 may be a wireless communication module. The bus 28 connects the processor 21, the memory 22, the auxiliary storage device 23, and the like so that they can exchange data with each other.

Figure 3:
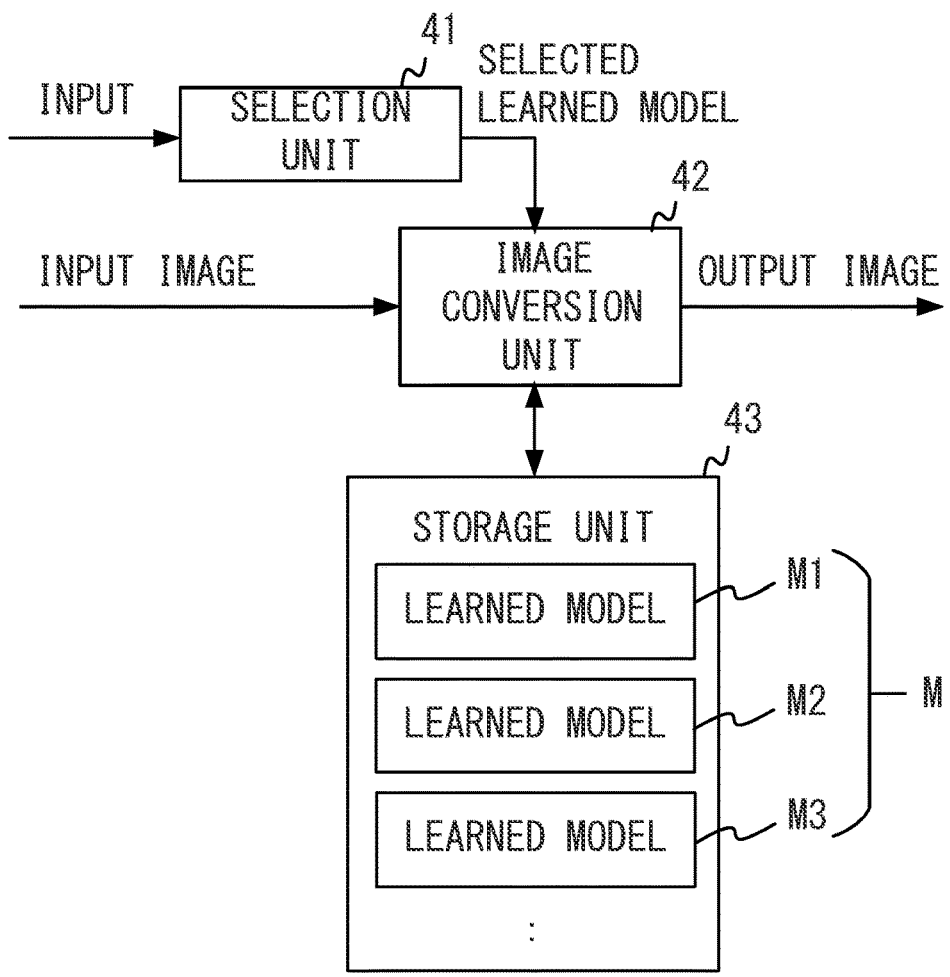
FIG. 3 is a diagram illustrating a functional configuration of the image processing unit according to a first embodiment.
Figure 4:
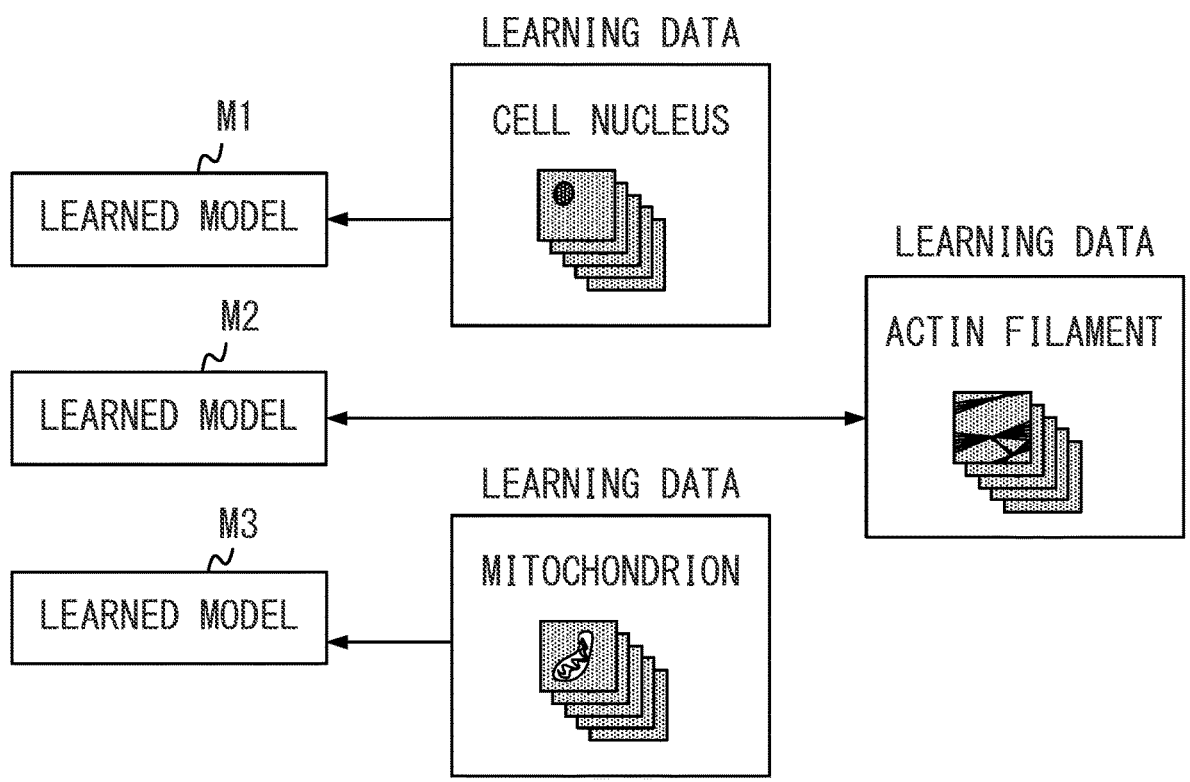
FIG. 4 is a diagram illustrating examples of a plurality of learned models.
Figure 5:
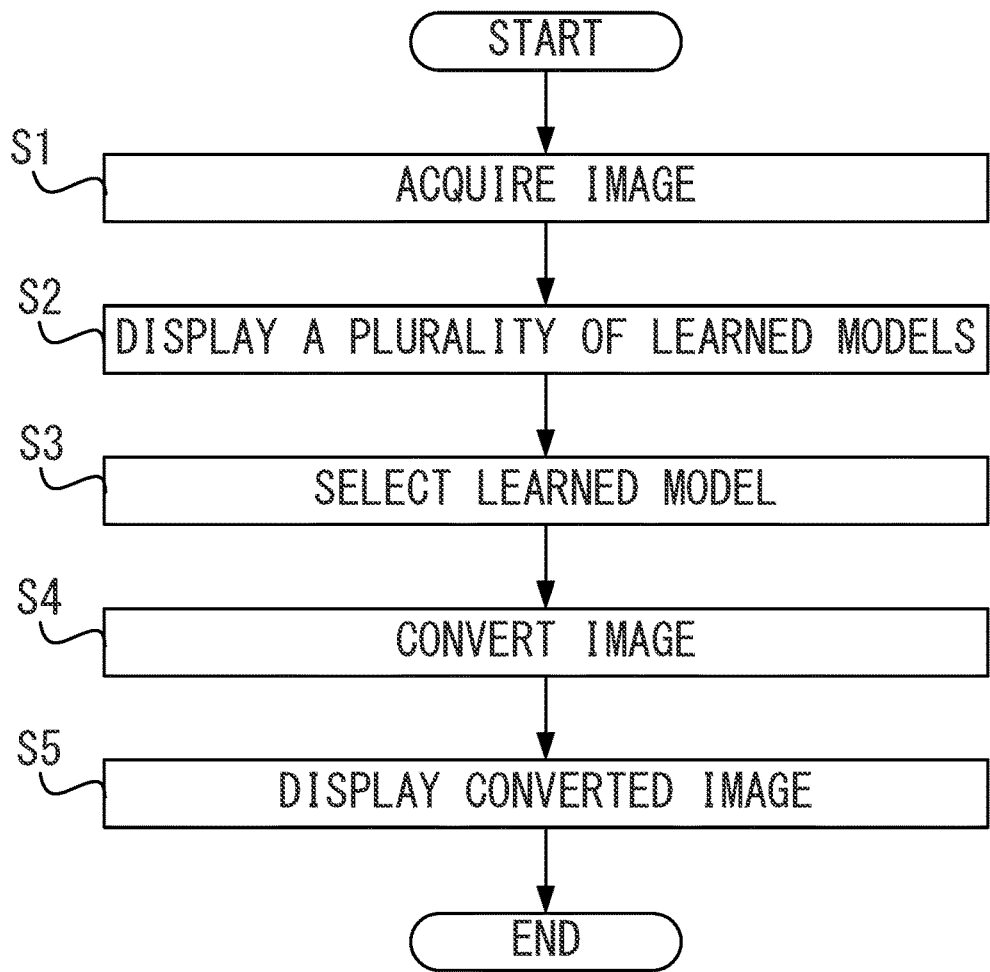
FIG. 5 is a flowchart showing an example of processing performed by the image processing unit.
Figure 6:
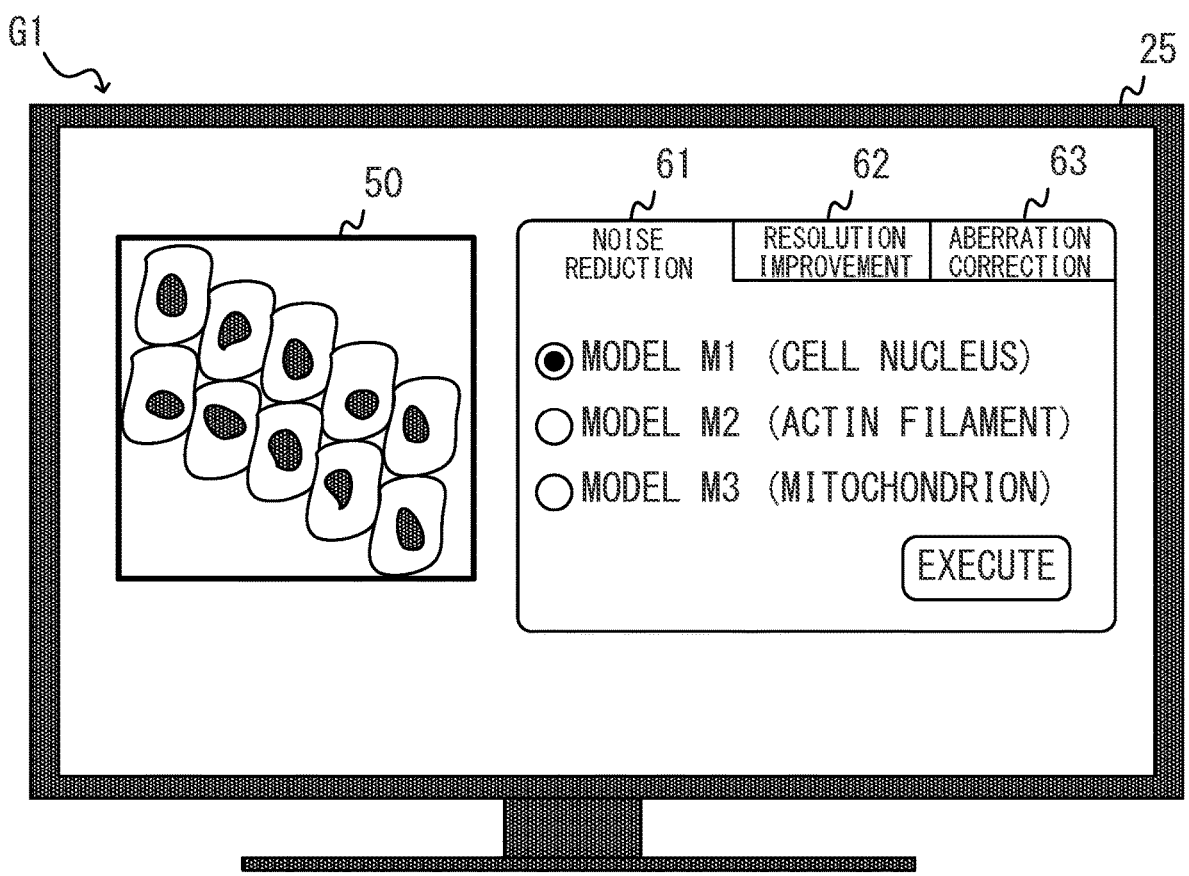
FIG. 6 is a diagram showing an example of a screen displayed by the image processing unit.

FIG. 3 is a diagram illustrating a functional configuration of the image processing unit 20 according to the present embodiment. FIG. 4 is a diagram illustrating examples of a plurality of learned models. FIG. 5 is a flowchart showing an example of processing performed by the image processing unit 20. FIG. 6 is a diagram showing an example of a screen displayed by the image processing unit 20. In the following, an image processing method performed by the system 1 will be described with reference to FIGS. 3 to 6.

As illustrated in FIG. 3, the image processing unit 20 includes, as a configuration related to the image processing method performed by the system 1, a selection unit 41 that selects a learned model from a plurality of learned models, an image conversion unit 42 that performs image conversion using the learned model selected by the selection unit 41, and a storage unit 43 that stores the plurality of learned models.

The selection unit 41, the image conversion unit 42, and the storage unit 43 are a functional configuration implemented by one or more circuitries included in the image processing unit 20. More specifically, the selection unit 41 and the image conversion unit 42 are a functional configuration implemented by, for example, the processor 21 and the memory 22 illustrated in FIG. 2, and the configuration may be implemented by the processor 21 executing a program stored in the memory 22. The storage unit 43 may be a functional configuration implemented by, for example, the memory 22 and the auxiliary storage device 23 illustrated in FIG. 2.

The selection unit 41 selects a learned model according to an input from the plurality of learned models stored in the storage unit 43. Further, the selection unit 41 outputs information for identifying the selected learned model to the image conversion unit 42.

The image conversion unit 42 applies the learned model selected by the selection unit 41 to the input image to perform image conversion, and generates an output image. The output image may be stored in the auxiliary storage device 23, for example. Further, the output image may be displayed on the display device 25, for example. Furthermore, the output image may be output to the terminal unit 30 via the communication module 27, for example, and may be displayed by a display device of the terminal unit 30.

Each of the plurality of learned models stored in the storage unit 43 is a learned model that has learned image conversion that converts an input image into an output image having higher image quality than the input image. Hereinafter, when the plurality of learned models M1, M2, M3, . . . are not particularly distinguished, each learned model or a set of learned models is referred to as a learned model(s) M.

The learned model M stored in the storage unit 43 may be generated by, for example, performing the following procedures in advance. When the image quality factor to be improved by the learned model M is noise, first, a plurality of pairs of an image with a small amount of noise and an image with a large amount of noise are prepared. The images constituting the pair are images of the same object. Specifically, images of the same sample are captured at the same imaging position to acquire an image with a small amount of noise and an image with a large amount of noise as a pair. This is repeated at a plurality of imaging positions or using a plurality of samples of the same type. Then, a learned model M is generated by causing the model to learn image conversion that converts the image with a large amount of noise into an image with a small amount of noise by deep learning using the plurality of pairs of images. Note that the amount of noise included in each image can be adjusted, for example, by changing the length of the exposure time and the illumination intensity when the image is captured. Therefore, pairs of images each including an image captured with a relatively long exposure time as the image with a small amount of noise and an image captured with a relatively short exposure time as the image with a large amount of noise may be used for the model learning.

When the image quality factor to be improved by the learned model M is resolution, first, a plurality of pairs of a low resolution image and a high resolution image are prepared. The images constituting the pair are images of the same object. Specifically, images of the same sample are captured at the same imaging position to acquire a low resolution image and a high resolution image as a pair. This is repeated at a plurality of imaging positions or using a plurality of samples of the same type. Then, a learned model M is generated by causing the model to learn image conversion that converts a low resolution image into a high resolution image by deep learning using the plurality of pairs of images. Note that the resolution of each image can be adjusted by changing the pixel resolution or optical resolution. For example, the resolution may be adjusted by changing the objective lens or the like used when the image is captured. Therefore, pairs of images each including an image captured using an objective lens having a relatively low numerical aperture as the low resolution image, and an image captured using an objective lens having a relatively high numerical aperture as the high resolution image may be used for the model learning.

When the image quality factor to be improved by the learned model M is something caused by aberration, first, a plurality of pairs of an image in which the aberration is not sufficiently corrected and an image in which the aberration is sufficiently corrected are prepared. The images constituting the pair are images of the same object. Specifically, images of the same sample are captured at the same imaging position to acquire an image in which the aberration is not sufficiently corrected and an image in which the aberration is sufficiently corrected as a pair. This is repeated at a plurality of imaging positions or using a plurality of samples of the same type. Then, a learned model M is generated by causing the model to learn image conversion that converts the image in which the aberration is not sufficiently corrected into an image in which the aberration is sufficiently corrected by deep learning using the plurality of pairs of images. Note that the degree of aberration correction can be adjusted, for example, by changing the objective lens used when capturing the image. Therefore, pairs of images each including an image captured using an objective lens having a relatively large aberration as the image in which the aberration is not sufficiently corrected, and an image captured using an objective lens having a relatively small aberration as the image in which the aberration is sufficiently corrected may be used for the model learning.

Regardless of the image quality factor to be improved by the learned model M, each of the plurality of learned models M is a learned model learned using images that differ from the images used by the other learned models in at least the sample type. In this example, as illustrated in FIG. 4, a learned model M1 is a learned model learned using images of cell nuclei. A learned model M2 is a learned model learned using images of actin filaments. A learned model M3 is a learned model learned using images of mitochondria.

As illustrated in FIG. 5, when a user selects an image whose image quality is to be improved using the input device 24 from the images acquired by image acquisition unit 10, the image processing unit 20 configured as described above acquires the selected image as an input image 50 (step S1). Here, the image processing unit 20 acquires the image selected by the user as the input image 50, and displays a screen G1 including the input image 50 on the output device 25 as illustrated in FIG. 6. Note that, in this example, cell nuclei are shown in the input image 50.

Next, when the user who has viewed the screen G1 selects the content of the image quality improvement to be performed on the input image 50 using the input device 24, the image processing unit 20 displays a plurality of learned models corresponding to the selected content of the image quality improvement (step S2). FIG. 6 illustrates an example in which the user has selected "noise reduction" using a tab 61. Three learned models (M1 to M3) for respective cell nuclei, actin filaments, and mitochondria are displayed on the screen G1 illustrated in FIG. 6.

After that, when the user selects a learned model in accordance with the type of the sample shown in the input image 50 from the three learned models M using the input device 24, the image processing unit 20 selects the learned model selected by the user (step S3). Here, the selection unit 41 of the image processing unit 20 selects the learned model M1 for cell nuclei from the plurality of learned models M according to the selection of the user.

Further, when the user presses an execute button using the input device 24, the image processing unit 20 converts the input image 50 using the learned model selected in step S3 (step S4). Here, the image conversion unit 42 of the image processing unit 20 applies the learned model M1 selected in step S3 to the input image 50 acquired in step S1, and generates an output image with reduced noise as compared with that of the input image 50.

Finally, the image processing unit 20 displays the image after conversion obtained in step S4 (step S5). Here, the image processing unit 20 displays the output image generated in step S4 on the output device 25. The output image may be displayed side by side with the input image 50, or may be displayed in the form of a pop-up.

As described above, in the system 1 according to the present embodiment, focusing on the fact that the image quality improvement performance of a single learned model varies depending on the type of the sample shown in the input image, a learned model M is prepared for each sample type in advance. That is, an optimized learned model M is prepared for each sample. The user is prompted to select a learned model in accordance with the type of the sample shown in the input image 50 from the plurality of learned models M generated for different sample types. Note that the type of the sample corresponding to the learned model selected by the user does not necessarily need to match the type of the sample shown in the input image 50. The user may select a learned model learned using images of a sample having a shape similar to the sample shown in the input image 50.

The main reason why the image quality improvement performance of a learned model differs depending on the sample is that each sample has a different shape. With regard to such a problem, the system 1 can apply, to the input image 50, a learned model learned using images similar to the input image 50 regardless of the sample shown in the input image 50. Accordingly, even when images of various samples having different shapes are input as the input images 50, the learned models can exhibit stable image quality improvement performance regardless of the input image 50. Therefore, according to the system 1, the system 1 as a whole can realize high generalization performance in image processing for improving image quality.

In addition, according to the system 1, image quality can be improved by image processing. In cases where the image acquisition unit 10 acquires images with higher image quality, there may be a trade-off with image quality in aspects other than image quality. For example, if the exposure time is extended for noise reduction, the image acquisition takes time. If the illumination intensity is increased, the damage to the sample increases. If the numerical aperture is increased in order to improve the resolution, an immersion liquid needs to be used. In particular, when the numerical aperture is high, it is necessary to use oil as the immersion liquid, which increases the amount of work of the user such as cleaning. In addition, if the magnification of the objective lens is increased, the observation range is narrowed. In addition, if a high-performance objective lens is used for aberration correction, the cost of the device increases. In the system 1, these disadvantages can be avoided by improving the image quality by image processing.

Meanwhile, the image quality improvement performance of a single learned model varies depending on the image quality range of the input image 50. The main reason why the image quality improvement performance of a learned model varies depending on the image quality range is that the appearance of an image varies depending on the image quality range. As a result, for example, if an image with a high noise level is input to a learned model capable of converting an image with a medium noise level into an image with a low noise level, the noise level may not be sufficiently reduced. Further, if an image with a medium noise level is input to a learned model capable of converting an image with a high noise level into an image with a low noise level, this may cause an effect such as the signal being weakened.

Therefore, although an example in which a learned model is prepared for each sample type has been described in the first embodiment described above, a learned model may be prepared for each image quality range before image quality improvement. In this case, there is a difference from the above-described first embodiment in that each of the plurality of learned models stored in the storage unit 43 is a learned model learned using images that differ from those used by the other learned models in at least image quality range.

Figure 7:
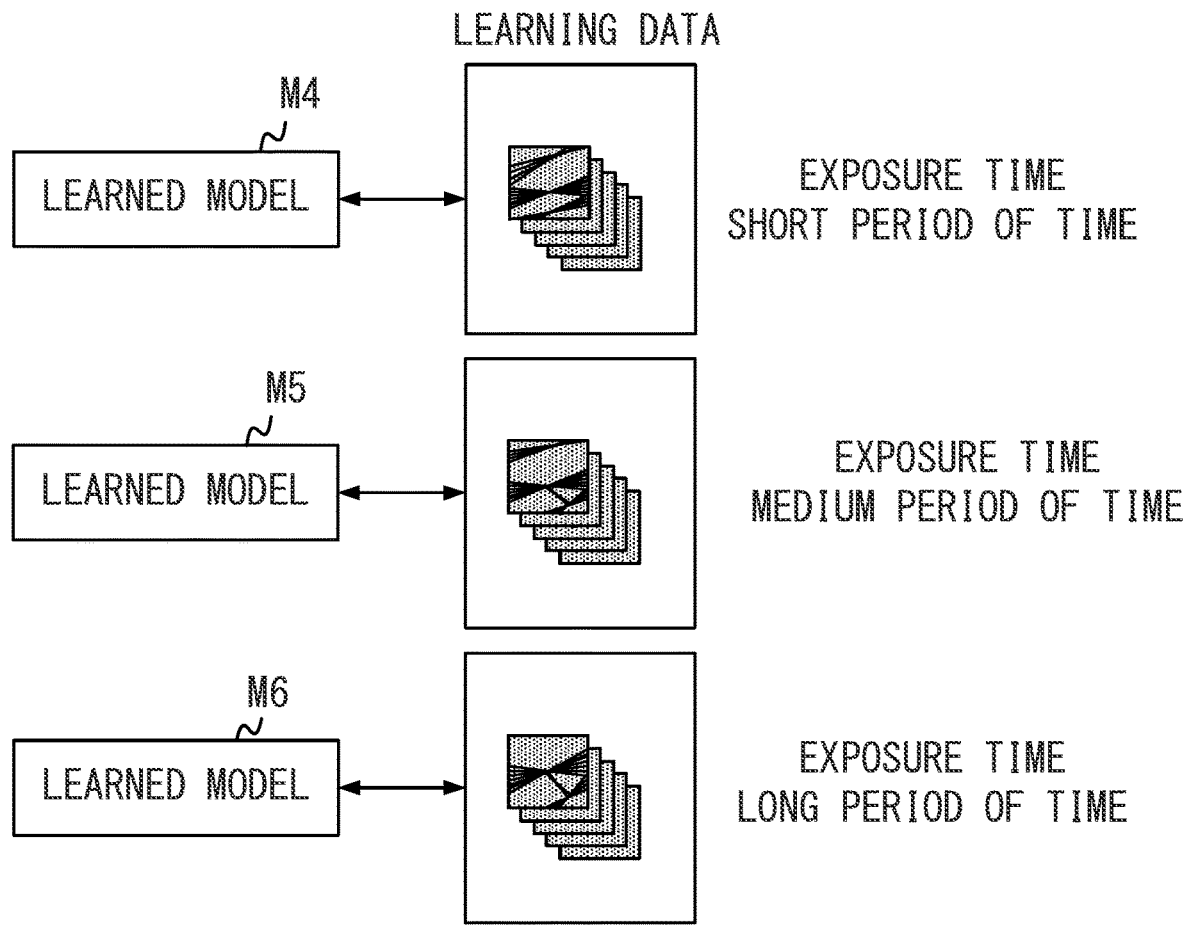
FIG. 7 is a diagram illustrating other examples of the plurality of learned models.
Figure 8:
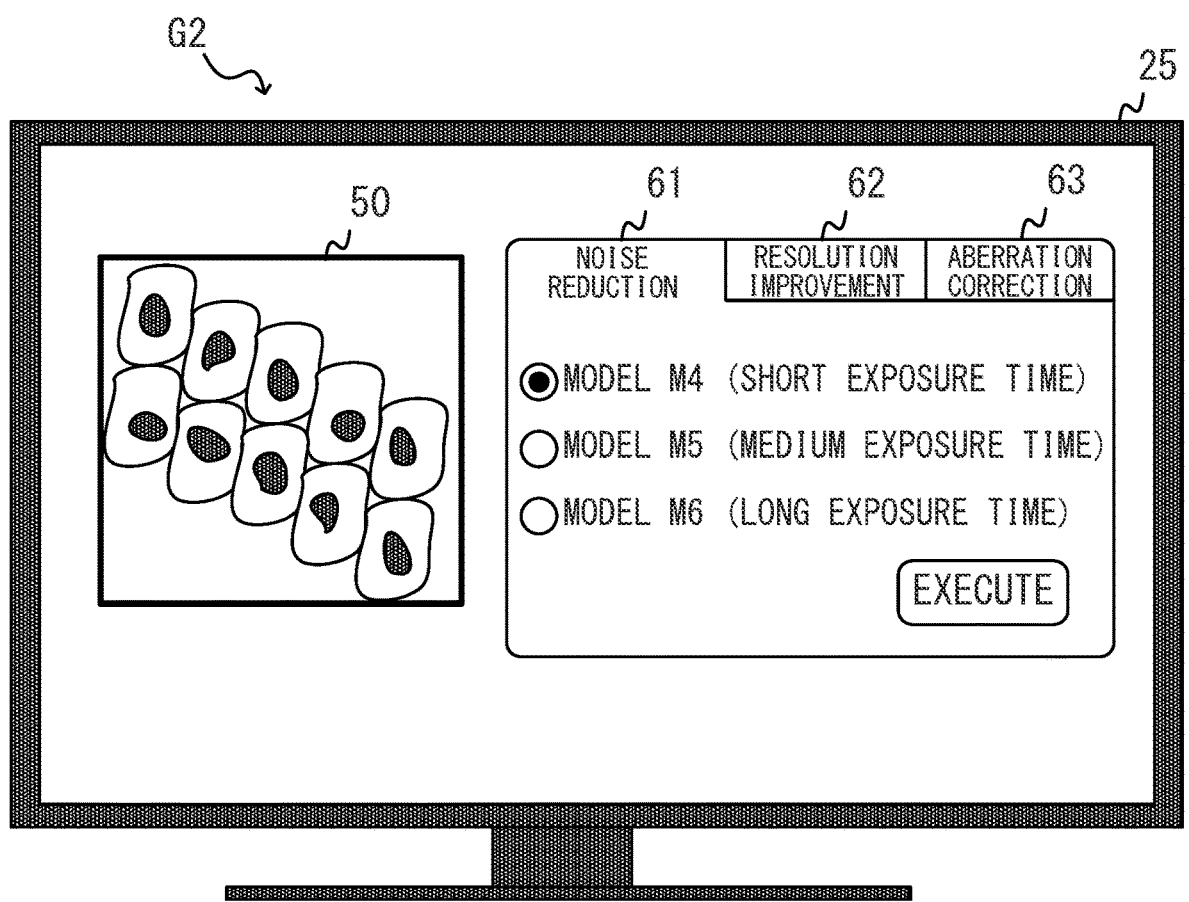
FIG. 8 is a diagram showing another example of a screen displayed by the image processing unit.
Figure 9:
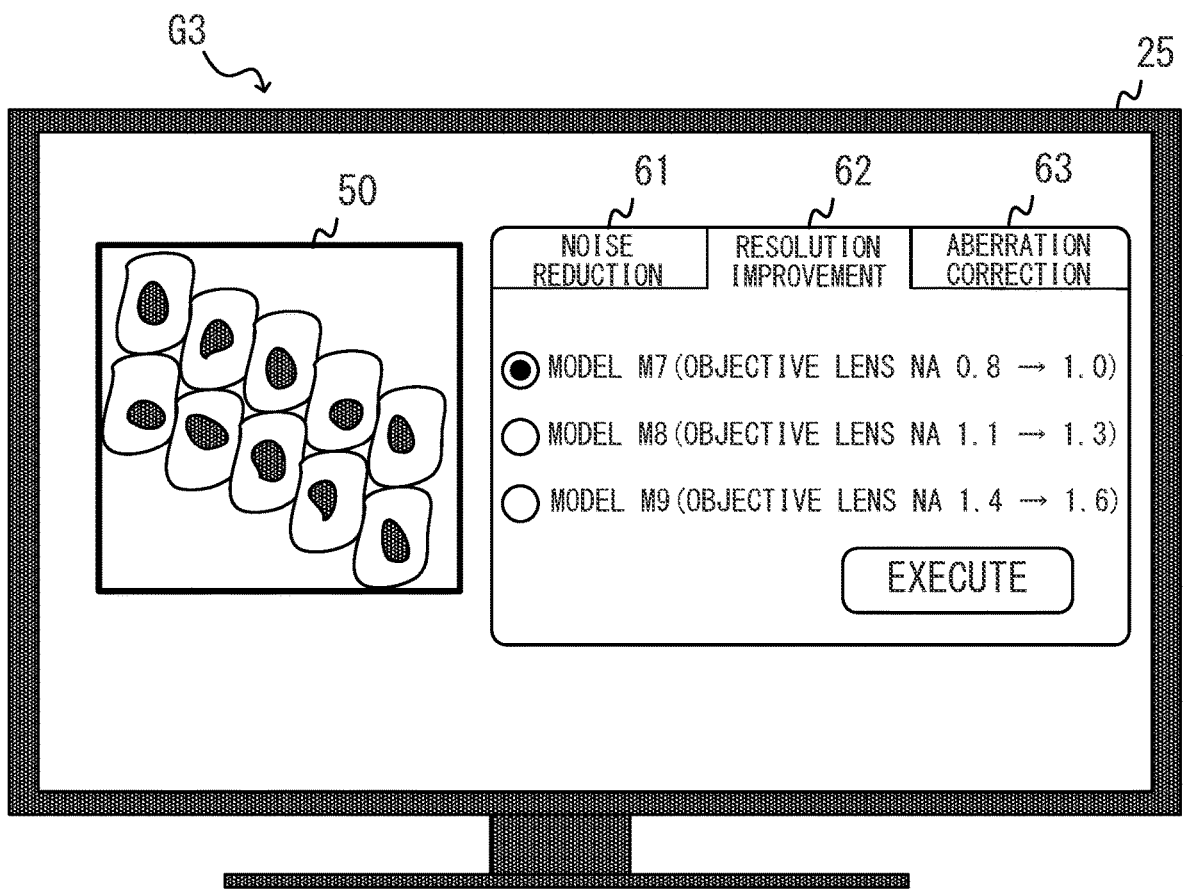
FIG. 9 is a diagram showing yet another example of a screen displayed by the image processing unit.
Figure 10:
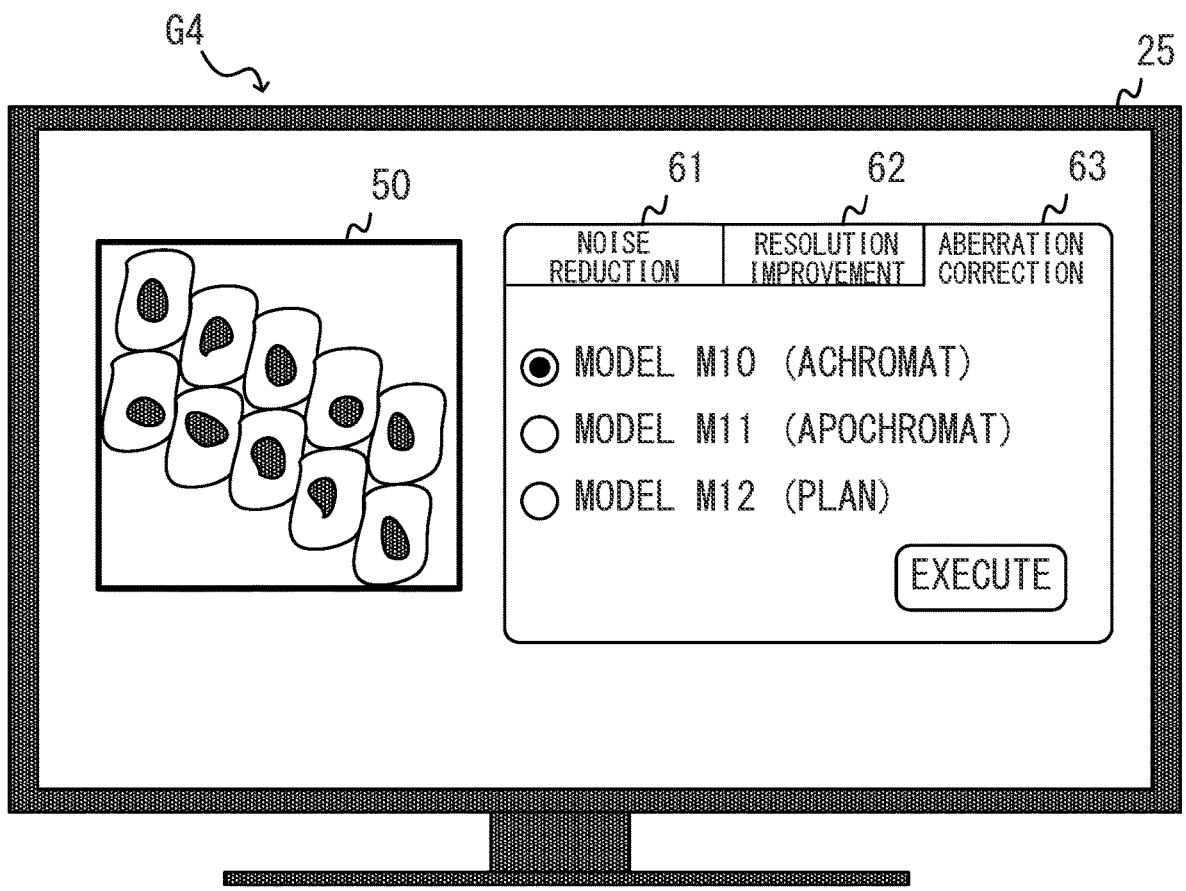
FIG. 10 is a diagram showing yet another example of a screen displayed by the image processing unit.

FIG. 7 is a diagram illustrating other examples of the plurality of learned models. FIGS. 8 to 10 are each a diagram showing another example of a screen displayed by the image processing unit 20. A variation of the first embodiment will be described below with reference to FIGS. 7 to 10.

In the variation, each of a plurality of learned models for improving noise stored in the storage unit 43 is a learned model learned using images that differ from the images used by the other learned models in at least the noise level range. Specifically, those images among the pairs of images that are used as the inputs to each of the plurality of learned models have an exposure time different from those of the images used by the other learned models. In the example of FIG. 7, a learned model M4 is a model learned using images captured with a relatively short exposure time as those images among the pairs of images that are used as inputs to the model. A learned model M5 is a model learned using images captured with a medium exposure time as those images among the pairs of images that are used as inputs to the model. A learned model M6 is a model learned using images captured with a relatively long exposure time as those images among the pairs of images that are used as inputs to the model.

Each of the plurality of learned models for improving resolution stored in the storage unit 43 is a learned model learned using images that differ from the images used by the other learned models in at least the resolution range. Specifically, for example, the numerical aperture of the objective lens used to capture those images among the pairs of images that are used as the inputs to each of the plurality of learned models is different from those used for the other learned models. That is, each of the learned models is a learned model learned with images acquired using an objective lens having a numerical aperture different from those used for the other learned models.

Each of the plurality of learned models for improving aberration level stored in the storage unit 43 is a learned model learned using images that differ from the images used by the other learned models in at least the aberration level range. Specifically, for example, the aberration performance of the objective lens used to capture those images among the pairs of images that are used as the inputs to each of the plurality of learned models is different from those used for the other learned models. That is, each of the plurality of learned models is a learned model learned with images acquired using an objective lens having an aberration performance different from those used for the other learned models.

In the variation, when the tab 61 is selected, the image processing unit 20 displays a screen G2 illustrated in FIG. 8 on the output device 25. The user can learn the noise level handled by each learned model by referring to the screen G2. For example, the user can learn that the learned model M4 can handle images captured with a short exposure time, that is, images with a large amount of noise. Therefore, the user can select a learned model from the learned models M4 to M6 according to the noise level of the input image 50. Accordingly, the system 1 can exhibit stable noise reduction performance regardless of the noise level of the input image 50.

When a tab 62 is selected, the image processing unit 20 displays a screen G3 illustrated in FIG. 9 on the output device 25. The user can learn the resolution handled by each learned model by referring to the screen G3. For example, the user can learn that a learned model M7 can convert images with NAs of around 0.8 into images with NAs of around 1.1. Therefore, since the user can select a learned model from learned models M7 to M9 according to the resolution of the input image 50, stable resolution improvement performance can be exhibited regardless of the resolution of the input image 50.

When a tab 63 is selected, the image processing unit 20 displays a screen G4 illustrated in FIG. 10 on the output device 25. The user can learn the aberration level handled by each learned model by referring to the screen G4. For example, the user can learn that a learned model M10 can further improve the aberration correction state at the achromatic level. Therefore, the user can select a learned model from learned models M10 to M12 according to the aberration level of the input image 50. Accordingly, the system 1 can exhibit stable aberration correction performance regardless of the aberration level of the input image 50.

As described above, also in the variation, the system 1 as a whole can realize high generalization performance in image processing for improving image quality as in the first embodiment. In addition, since image quality improvement is achieved by image processing, it is possible to avoid the disadvantages caused by acquiring images with higher image quality by the image acquisition unit 10.

Note that, in the above, an example has been described in which the exposure time is used as a means for classifying the noise levels of the images. However, for example, the illumination intensity or a combination of the exposure time and the illumination intensity may be used to classify the noise levels. In addition, the noise level and the way the noise appears vary depending on the type of the image acquisition device as well. Specifically, for example, an image acquired using a laser scanning microscope and an image acquired using a wide-field microscope having a digital camera are different in noise level and the way the noise appears. Therefore, the type of the image acquisition device may be used to classify the noise level. A learned model learned from images acquired with a laser scanning microscope and a learned model learned from images acquired with a wide-field microscope may be prepared, and the learned model may be selected according to the image acquisition device used to acquire the input image. In addition, an example in which the numerical aperture of the objective lens is used as a means for classifying the resolution of the image has been described. However, when images are acquired using a laser scanning microscope, another index that affects the optical resolution, such as the confocal pinhole diameter, may be used for the classification of the resolution. Besides an index that affects the optical resolution, an index that affects the pixel resolution such as the magnification of the objective lens, digital zoom, or scan size may be used. It is also possible to use a combination of these indices. That is, each of the plurality of learned models may be a learned model learned using images acquired with a laser scanning microscope having a confocal pinhole diameter different from those used for the other learned models, or may be a learned model learned using images acquired with a pixel resolution different from those used for the other learned models.

Further, an example has been described above in which the image quality ranges of the images included in the learning data are classified using settings of the image acquisition unit 10 (for example, a device itself such as an objective lens to be used, or a setting of a device such as the exposure time) upon image capturing. However, the image quality ranges may be classified from information other than settings of the image acquisition unit 10. For example, a person who has observed the images may subjectively classify their image quality ranges.

(Second Embodiment)

Figure 11:
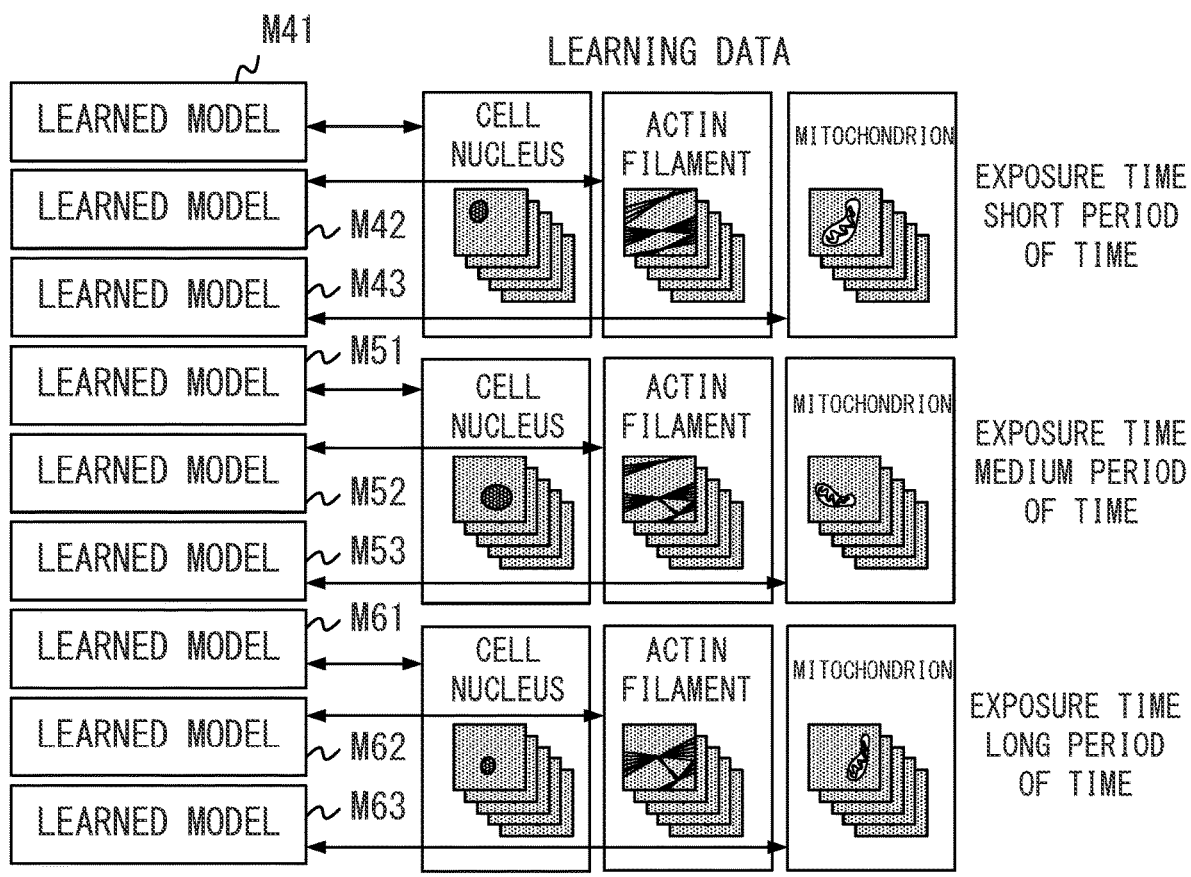
FIG. 11 is a diagram illustrating further examples of the plurality of learned models.
Figure 12:
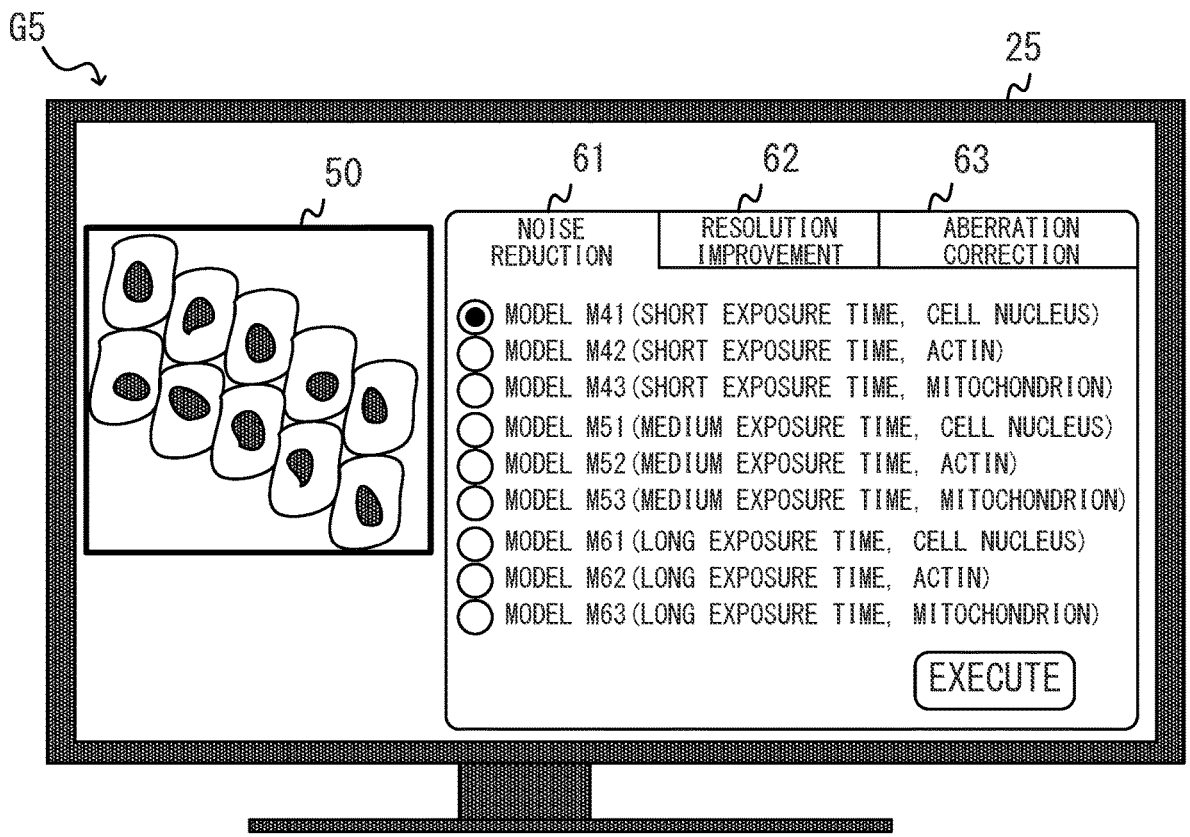
FIG. 12 is a diagram showing yet another example of a screen displayed by the image processing unit.

FIG. 11 is a diagram illustrating further examples of the plurality of learned models. FIG. 12 is a diagram showing yet another example of a screen displayed by the image processing unit 20. Referring to FIGS. 11 and 12, a description will be given below of the second embodiment.

In the present embodiment, each of the plurality of learned models for improving noise stored in the storage unit 43 is a learned model learned using images that differ from the images used by the other learned models in at least the combination of the noise level range and the sample type. That is, as illustrated in FIG. 11, a learned model is prepared for each combination of a noise level range and a sample type. Specifically, those images among the pairs of images that are used as the inputs to each of the plurality of learned models have a combination of an exposure time and a sample type different from those used for the other learned models. In the example of FIG. 11, learned models M41 to M43 are models learned using images captured with a relatively short exposure time as those images among the pairs of images that are used as inputs to the models, and are models learned using images of different samples. Learned models M51 to M53 are models learned using images captured with a medium exposure time as those images among the pairs of images that are used as inputs to the models, and are models learned using images of different samples. Learned models M61 to M63 are models learned using images captured with a relatively long exposure time as those images among the pairs of images that are used as inputs to the models, and are models learned using images of different samples.

Each of the plurality of learned models for improving resolution stored in the storage unit 43 is a learned model learned using images that differ from the images used by the other learned models in at least the combination of the resolution range and the sample type. Further, each of the plurality of learned models for improving aberration level stored in the storage unit 43 is a learned model learned using images that differ from the images used by the other learned models in at least the combination of the aberration level range and the sample type.

In the present embodiment, when the tab 61 is selected, the image processing unit 20 displays a screen G5 illustrated in FIG. 12 on the output device 25. The user can learn the combination of the noise level and the sample handled by each learned model by referring to the screen G5. For example, the user can learn that the learned model M41 can handle images of nucleus samples captured with a short exposure time, that is, images with a large amount of noise. Therefore, the user can select a learned model from the learned models M41 to M63 according to the combination of the sample and the noise level of the input image 50. Accordingly, the system 1 can exhibit stable noise reduction performance regardless of the combination of the sample and the noise level of the input image 50.

As described above, according to the present embodiment, the system 1 as a whole can realize a generalization performance in image processing for improving image quality that is even higher than that of the first embodiment. In addition, since image quality improvement is achieved by image processing, it is possible to avoid the disadvantages caused by acquiring images with higher image quality by the image acquisition unit 10.

(Third Embodiment)

Figure 13:
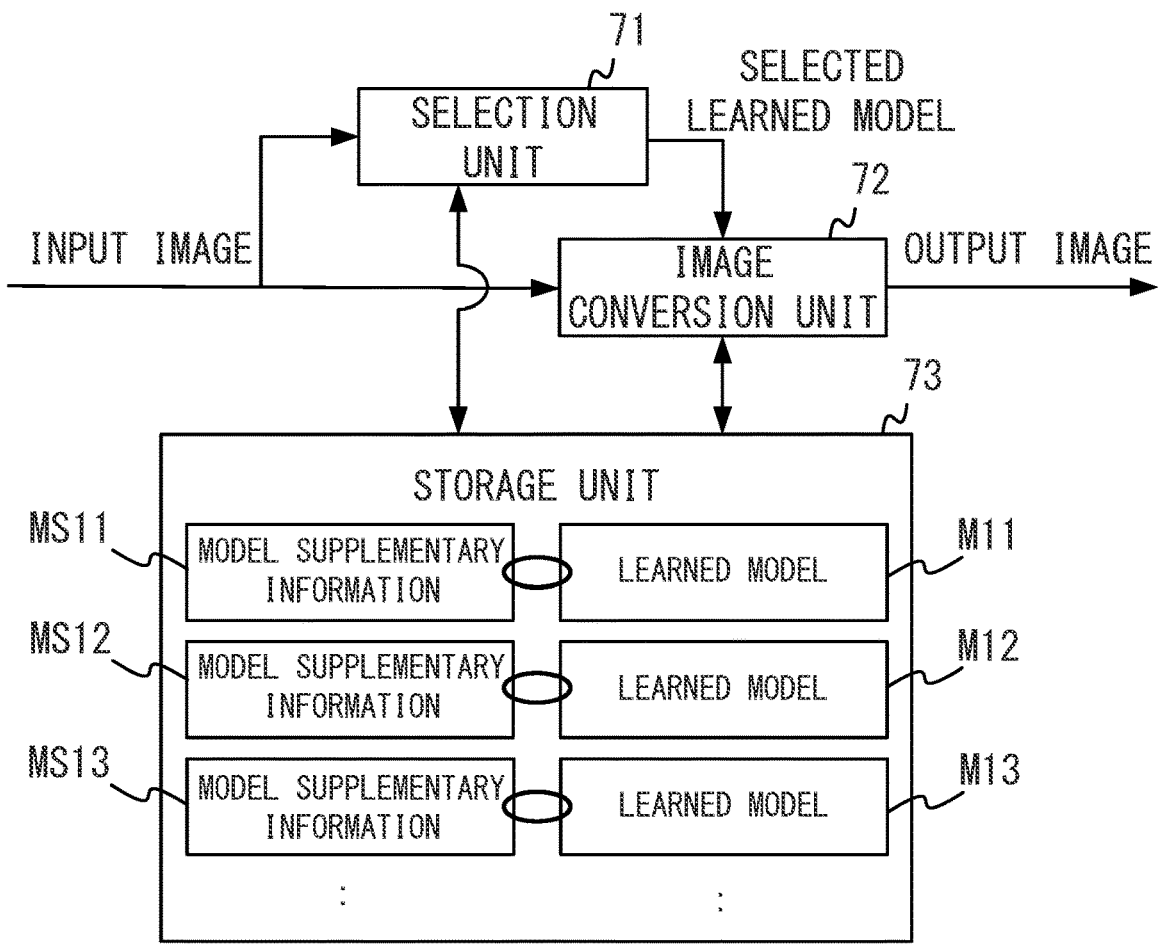
FIG. 13 is a diagram illustrating a functional configuration of the image processing unit according to a third embodiment.
Figure 14:
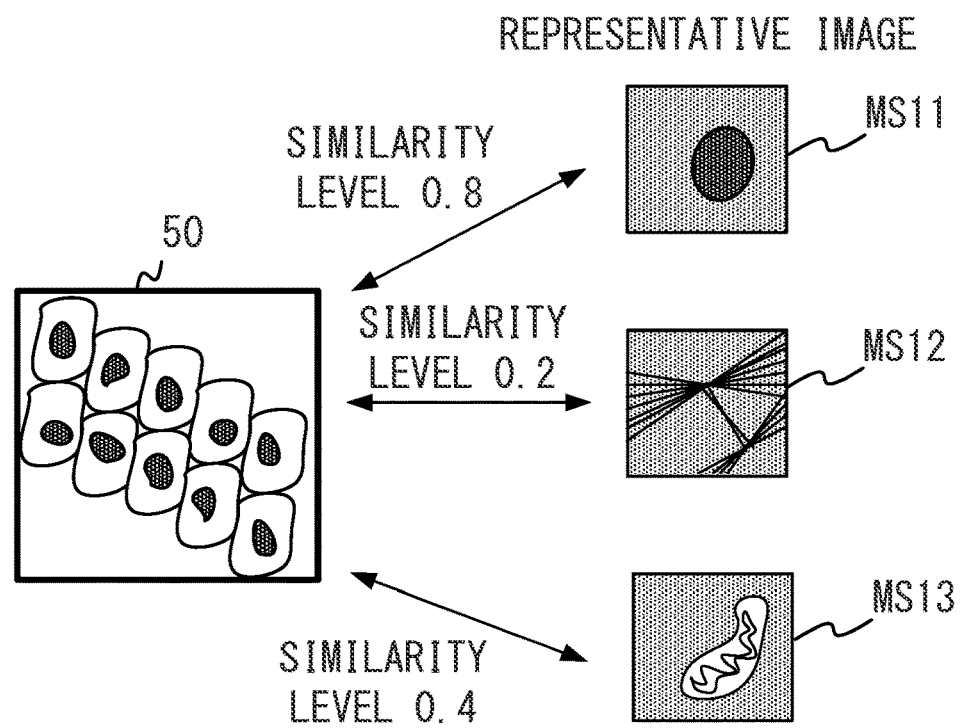
FIG. 14 is a diagram illustrating selection of a learned model based on a similarity level.

FIG. 13 is a diagram illustrating a functional configuration of the image processing unit 20 according to the present embodiment. FIG. 14 is a diagram illustrating selection of a learned model based on a similarity level. Referring to FIGS. 13 and 14, a description will be given below of the third embodiment.

In the present embodiment, as illustrated in FIG. 13, the image processing unit 20 includes a selection unit 71 that selects a learned model from a plurality of learned models M11 to M13, an image conversion unit 72 that performs image conversion using the learned model selected by the selection unit 71, and a storage unit 73 that stores the plurality of learned models M11 to M13. The image processing unit 20 according to the present embodiment is different from the image processing unit 20 according to the first embodiment in the following two points.

First, the storage unit 73 stores a plurality of pieces of model supplementary information MS11 to MS13 indicating features of the plurality of learned models M11 to M13 in association with the plurality of learned models. In a case where the plurality of learned models M11 to M13 are learned models each learned with images that differ from the images used by the other learned models in at least sample type, the pieces of model supplementary information MS11 to MS13 are, for example, a plurality of representative images corresponding to the sample types of the plurality of learned models M11 to M13. The representative image is desirably an image in which the shape characteristics of the sample are well captured.

The second point is that the selection unit 71 selects a learned model to be used for image conversion from the plurality of learned models M11 to M13 based on the input image 50 and the pieces of model supplementary information MS11 to MS13. For example, the selection unit 71 may compare the input image 50 with each of the representative images (pieces of model supplementary information MS11 to MS13) and select a learned model on the basis of the comparison result. More specifically, as illustrated in FIG. 14, the selection unit 71 may compare the input image 50 with each of the representative images (pieces of model supplementary information MS11 to MS13) to calculate similarity levels, and select the learned model corresponding to the representative image having the highest similarity level. Note that the similarity level may be calculated using any known algorithm such as an algorithm for calculating the local feature amount. The similarity level may also be calculated using a learned model that has learned similar images in advance. In the example illustrated in FIG. 14, the learned model M11 corresponding to the representative image, which is the model supplementary information MS11, is selected as the learned model to be used for image conversion.

In the present embodiment, the selection of the learned model according to the input image 50 is automatically performed by the image processing unit 20. Therefore, the user can obtain an image with improved image quality by only selecting an image whose image quality is to be improved. In addition, since the learned model is appropriately selected by the image processing unit 20, the system 1 as a whole can realize high generalization performance in image processing for improving image quality.

Although an example in which the pieces of model supplementary information MS11 to MS13 are images has been described, the model supplementary information is not limited to images. In a case where the plurality of learned models M11 to M13 are learned models each learned with images that differ from the images used by the other learned models in at least image quality range, the pieces of model supplementary information MS11 to MS13 may be a plurality of pieces of model image quality information corresponding to the image quality ranges of the images used in the learning of the plurality of learned models M11 to M13. More specifically, the model image quality information may be, for example, a digitized noise level or the like.

When the model image quality information is a digitized noise level, the selection unit 71 calculates the noise level of the input image 50 from the input image 50 as the input image quality information. The noise level of the input image 50 is not particularly limited, but may be calculated as, for example, the variance in luminance in the background part of the image. This is because it can be evaluated that the larger the variance in luminance is, the larger the noise is. Further, the selection unit 71 selects a learned model to be used for image conversion from the plurality of learned models M11 to M13 based on the result of comparison between the input image quality information and the plurality of pieces of model image quality information. More specifically, for example, the selection unit 71 may select the learned model corresponding to a noise level closest to the noise level of the input image 50 as the learned model used for image conversion. Also in this case, the user can obtain an image with improved image quality by only selecting an image whose image quality is to be improved.

(Fourth Embodiment)

Figure 15:
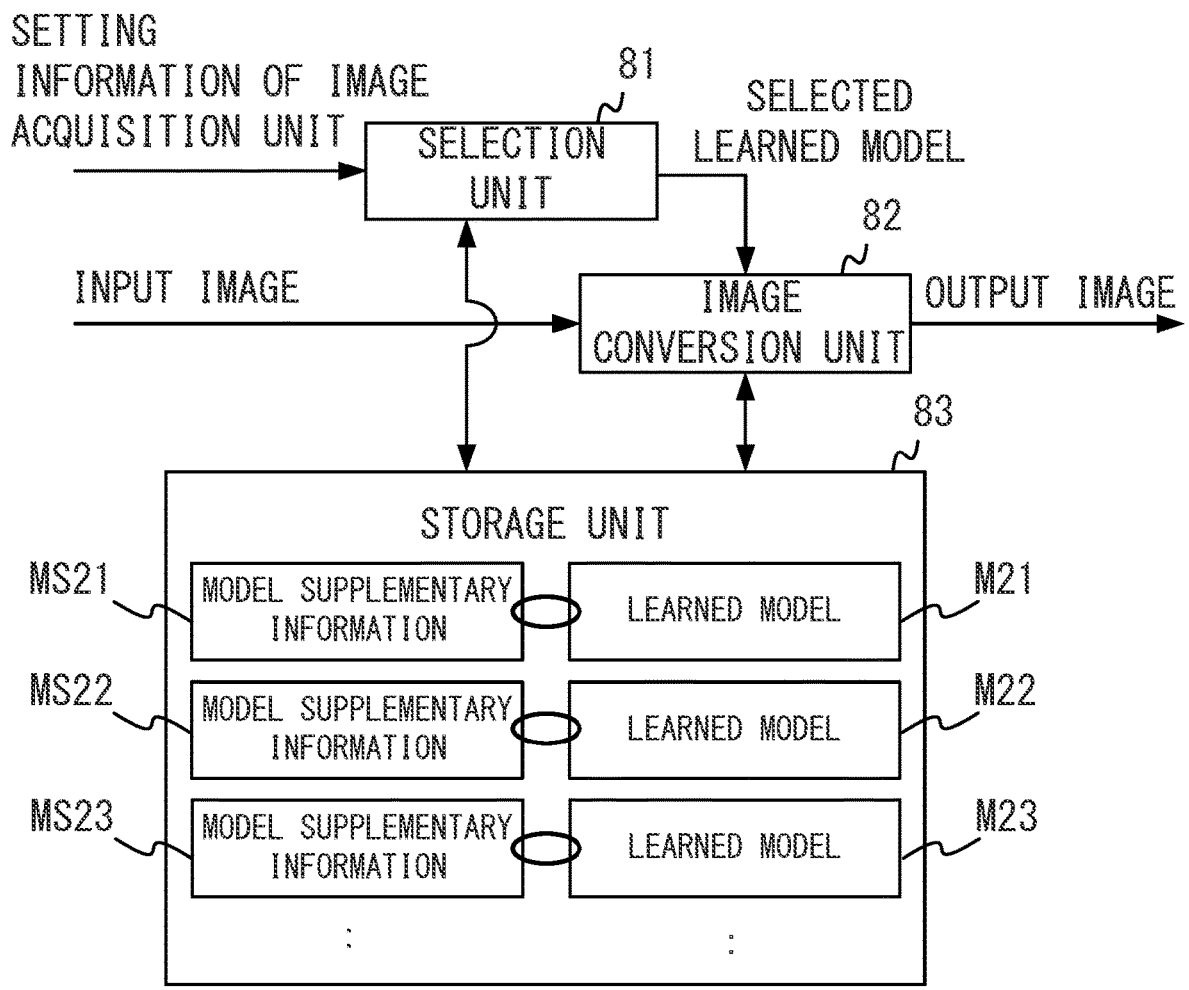
FIG. 15 is a diagram illustrating a functional configuration of the image processing unit according to a fourth embodiment.

FIG. 15 is a diagram illustrating a functional configuration of the image processing unit 20 according to the present embodiment. The fourth embodiment will be described below with reference to FIG. 15.

In the present embodiment, as illustrated in FIG. 15, the image processing unit 20 includes a selection unit 81 that selects a learned model from a plurality of learned models M21 to M23, an image conversion unit 82 that performs image conversion using the learned model selected by the selection unit 81, and a storage unit 83 that stores the plurality of learned models M21 to M23. The image processing unit 20 according to the present embodiment is different from the image processing unit 20 according to the first embodiment in the following two points.

First, the storage unit 83 stores a plurality of pieces of model supplementary information MS21 to MS23 indicating features of the plurality of learned models M21 to M23 in association with the plurality of learned models. Note that the plurality of learned models M21 to M23 stored in the storage unit 83 are learned models learned using images that differ from the images used by the other learned models in at least image quality range.

The second point is that the selection unit 81 acquires setting information of the image acquisition unit 10 and selects a learned model to be used for image conversion from the plurality of learned models M21 to M23 based on the acquired setting information and the pieces of model supplementary information MS21 to MS23. Specifically, for example, the selection unit 81 acquires information on the resolution of the microscope system 13 from the microscope system 13 that acquired the input image 50. In a case where the microscope system 13 is a laser scanning microscope, for example, the numerical aperture of the objective lens, the magnification of the objective lens, the scan size (for example, 512×512, 1024×1024) of the galvano scanner, the pinhole diameter, and/or the like are acquired. The selection unit 81 calculates the resolution of the input image 50 from these pieces of information, and compares the resolution with the resolutions specified by the plurality of pieces of model supplementary information MS21 to MS23 read from the storage unit 83. As a result of the comparison, for example, the selection unit 81 selects the model supplementary information indicating the resolution closest to the resolution of the input image 50, and selects the learned model corresponding to that model supplementary information as the learned model used for image conversion.

In the present embodiment, by acquiring the setting information from the image acquisition unit 10, similarly to the third embodiment, the selection of the learned model according to the input image 50 is automatically performed by the image processing unit 20. Therefore, the user can obtain an image with improved image quality by only selecting an image whose image quality is to be improved. In addition, since the image processing unit 20 selects an appropriate learned model, the system 1 as a whole can realize high generalization performance in image processing for improving image quality, which is also similar to the third embodiment.

The above embodiments are specific examples for facilitating understanding of the invention, and embodiments of the present invention are not limited to these embodiments. Part of the above-described embodiments may be applied to other embodiments. The image processing system, image processing method, and computer-readable medium can be variously modified or altered without departing from the scope of the claims.

Figure 16:
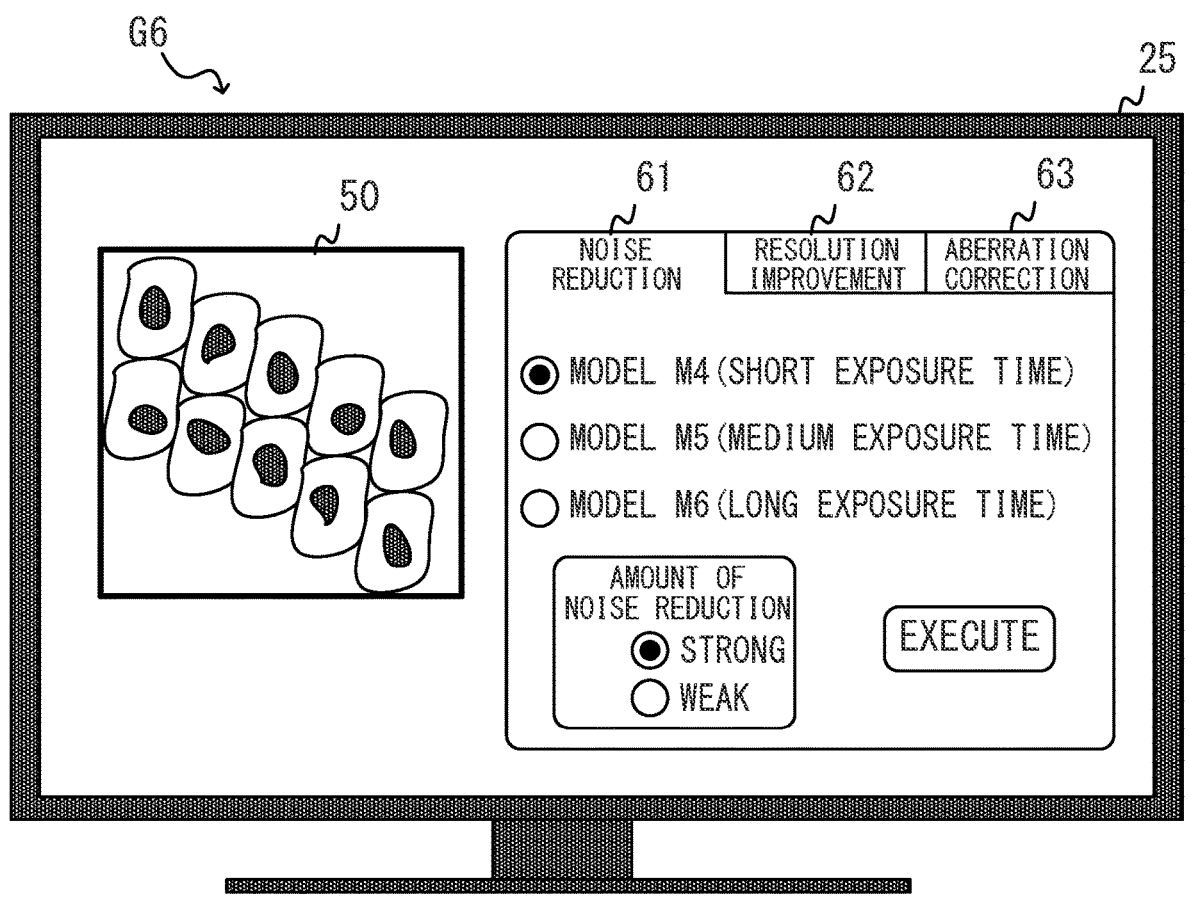
FIG. 16 is a diagram showing yet another example of a screen displayed by the image processing unit.

In the above-described embodiments, examples in which one learned model suitable for the input image is specified have been described. However, the image processing unit 20 may store a plurality of learned models suitable for the input image that have different degrees of image quality improvement. In this case, as illustrated in FIG. 16, a control (radio buttons in this example) for specifying the degree of image quality improvement may be provided on the screen G6, and one learned model may be determined based on the degree of image quality improvement desired by the user. As a result, the user can select the balance between the image quality and the side effects associated with the image processing by him/herself.

What is claimed is:

1. An image processing system comprising:
an image processing device including circuitry;
an optical microscope system that includes a plurality of objective lenses having different numerical apertures, and that acquires an input image to be input to the image processing device; and
a storage storing a plurality of learned models,
wherein:
the circuitry (i) selects, based on setting information indicating a parameter of the optical microscope system when the optical microscope system acquired the input image, a learned model from the plurality of learned models stored in the storage, each of the plurality of learned models being a model having learned an image conversion that converts the input image acquired by the optical microscope system into an output image having an image quality higher than an image quality of the input image, and (ii) performs the image conversion using the selected learned model,
each of the plurality of learned models is a learned model having learned using an image that differs from an image used by the remainder of the plurality of learned models in at least one of a sample type and an image quality range,
the setting information includes the numerical apertures of the objective lenses included in the optical microscope system, and
the circuitry selects the learned model based on the numerical aperture of the objective lens set for the optical microscope system when the optical microscope system acquired the input image.

2. The image processing system according to claim 1, wherein:
each of the plurality of learned models is a learned model having learned using an image that differs from an image used by the remainder of the plurality of learned models in at least image quality range,
the output image has a noise level lower than a noise level of the input image, and
the image quality range includes a noise level range.

3. The image processing system according to claim 2, wherein each of the plurality of learned models is a learned model having learned using an image acquired with an image acquisition device of a type that is different from a type of an image acquisition device used for the remainder of the plurality of learned models.

4. The image processing system according to claim 3, wherein the different types of image acquisition devices include a laser scanning microscope and a wide-field microscope having a digital camera.

5. The image processing system according to claim 1, wherein:
each of the plurality of learned models is a learned model learned using an image that differs from an image used by the remainder of the plurality of learned models in at least image quality range,
the output image has a resolution higher than a resolution of the input image, and
the image quality range includes a resolution range.

6. The image processing system according to claim 5, wherein each of the plurality of learned models is a learned model having learned using an image acquired with an objective lens having a numerical aperture that is different from a numerical aperture of an objective lens used for the remainder of the plurality of learned models.

7. The image processing system according to claim 5, wherein each of the plurality of learned models is a learned model having learned using an image acquired with a pixel resolution that is different from a pixel resolution used for the remainder of the plurality of learned models.

8. The image processing system according to claim 5, wherein each of the plurality of learned models is a learned model having learned using an image acquired with a laser scanning microscope having confocal pinholes of different diameters from one another.

9. The image processing system according to claim 1, wherein:
each of the plurality of learned models is a learned model having learned using an image that differs from an image used by the remainder of the plurality of learned models in at least image quality range,
the output image has an aberration level lower than an aberration level of the input image, and the image quality range includes an aberration level range.

10. The image processing system according to claim 9, wherein each of the plurality of learned models is a learned model having learned using an image acquired with an objective lens having an aberration performance that is different from an aberration performance of an objective lens used for the remainder of the plurality of learned models.

11. The image processing system according to claim 1, wherein:
the optical microscope system is a laser scanning microscope, and
the setting information includes at least one of a scan size of a galvano scanner and a pinhole diameter.

12. The image processing system according to claim 1, wherein:
the optical microscope system is a laser scanning microscope, and
the setting information further includes a pinhole diameter.

13. An image processing system comprising:
an image processing device including circuitry;
an optical microscope system that includes a plurality of objective lenses with different magnifications, and that acquires an input image to be input to the image processing device; and
a storage storing a plurality of learned models,
wherein:
the circuitry (i) selects, based on setting information indicating a parameter of the optical microscope system when the optical microscope system acquired the input image, a learned model from the plurality of learned models stored in the storage, each of the plurality of learned models being a model having learned an image conversion that converts the input image acquired by the optical microscope system into an output image having an image quality higher than an image quality of the input image, and (ii) performs the image conversion using the selected learned model,
each of the plurality of learned models is a learned model having learned using an image that differs from an image used by the remainder of the plurality of learned models in at least one of a sample type and an image quality range,
the setting information includes the magnifications of the objective lenses included in the optical microscope system, and
the circuitry selects the learned model based on the magnification of the objective lens set for the optical microscope system when the optical microscope system acquired the input image.

14. The image processing system according to claim 13, wherein the setting information further includes numerical apertures of the objective lenses included in the optical microscope system.

15. The image processing system according to claim 13, wherein the setting information further includes a pixel resolution of an image acquired in the optical microscope system.

16. The image processing system according to claim 13, wherein the setting information further includes an aberration level of the objective lenses included in the optical microscope system.

17. The image processing system according to claim 13, wherein:
the optical microscope system is a laser scanning microscope, and
the setting information further includes a pinhole diameter.

18. An image processing method comprising:
selecting a learned model from a plurality of learned models stored in a storage, each of the plurality of learned models being a model having learned an image conversion that converts an input image acquired by an optical microscope system into an output image having an image quality higher than an image quality of the input image, the optical microscope system including a plurality of objective lenses having different numerical apertures, and the selected learned model being selected based on setting information indicating a parameter of the optical microscope system when the optical microscope system acquired the input image; and
performing the image conversion using the selected learned model,
wherein:
each of the plurality of learned models is a learned model having learned using an image that differs from an image used by the remainder of the plurality of learned models in at least one of a sample type and an image quality range,
the setting information includes the numerical apertures of the objective lenses included in the optical microscope system, and
the selecting comprises selecting the learned model based on the numerical aperture of the objective lens set for the optical microscope system when the optical microscope system acquired the input image.

19. A non-transitory computer-readable medium storing a program that is executable to control a computer to execute processing comprising:
selecting a learned model from a plurality of learned models stored in a storage, each of the plurality of learned models being a model having learned an image conversion that converts an input image acquired by an optical microscope system into an output image having an image quality higher than an image quality of the input image, the optical microscope system including a plurality of objective lenses having different numerical apertures, and the selected learned model being selected based on setting information indicating a parameter of the optical microscope system when the optical microscope system acquired the input image; and
performing the image conversion using the selected learned model,
wherein:
each of the plurality of learned models is a learned model having learned using an image that differs from an image used by the remainder of the plurality of learned models in at least one of a sample type and an image quality range,
the setting information includes the numerical apertures of the objective lenses included in the optical microscope system, and
the selecting comprises selecting the learned model based on the numerical aperture of the objective lens set for the optical microscope system when the optical microscope system acquired the input image.

* * * * *